US007071583B2

(12) United States Patent
Fukasawa

(10) Patent No.: US 7,071,583 B2
(45) Date of Patent: Jul. 4, 2006

(54) UNIAXIAL DRIVE UNIT

(75) Inventor: Takashi Fukasawa, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 289 days.

(21) Appl. No.: 10/807,134

(22) Filed: Mar. 24, 2004

(65) Prior Publication Data
US 2004/0189234 A1 Sep. 30, 2004

(30) Foreign Application Priority Data
Mar. 26, 2003 (JP) ............................. 2003-085598

(51) Int. Cl.
H02K 41/00 (2006.01)
(52) U.S. Cl. ...................................................... 310/12
(58) Field of Classification Search ............ 310/12–14, 310/20, 80
See application file for complete search history.

(56) References Cited

U.S. PATENT DOCUMENTS 4,379,245 A * 4/1983 Goldstein .................... 310/319
5,210,636 A * 5/1993 Baer ........................... 359/200
5,909,066 A 6/1999 Nanba et al. ................. 310/12
6,008,552 A 12/1999 Yagoto et al. ................ 310/12
6,865,425 B1 * 3/2005 McNutt ......................... 700/1

FOREIGN PATENT DOCUMENTS
JP 08-331834 12/1996
JP 11-150973 6/1999

* cited by examiner

Primary Examiner—Karl Tamai
Assistant Examiner—Judson H. Jones
(74) Attorney, Agent, or Firm—David S. Safran

(57) ABSTRACT

A uniaxial drive unit is provided with a tiltable pulse generating device having a joystick, which generates a continuous pulse of a frequency corresponding to the tilt angle of the joystick, and a rotary encoder having a knob, which generates a pulse of a frequency corresponding to the turning speed of the knob and generates pulses of the number corresponding to the turning angle of the knob to drive a linear motor. High-speed and medium-speed operations are carried out by using the tiltable pulse generating device, and low-speed fine feed is carried out by using the rotary encoder.

4 Claims, 4 Drawing Sheets

UNIAXIAL DRIVE UNIT

BACKGROUND OF THE INVENTION

1. Field of the Invention

The present invention relates to a uniaxial drive unit using a pulse drive motor and, more particularly, to a uniaxial drive unit capable of carrying out fine feed.

2. Description of the Related Art

Conventionally, there has been known a uniaxial drive unit (referred also to as a linear motion type unit) which is made up of a fixed table and a moving table which is supported so as to be slidable in uniaxial direction with respect to the fixed table and is driven in this direction. Most of the uniaxial drive units of this type are driven by a motor of any type (for example, a pulse drive motor such as a stepping motor and a linear motor).

FIG. 5 is a perspective view showing one example of the uniaxial drive unit. In FIG. 5, a uniaxial drive unit 1 has a fixed table 2, a moving table 4 which is supported on sliding faces 3, 3 so as to be slidable in the uniaxial direction (the arrow-marked directions in FIG. 5) with respect to the fixed table 2, and a motor driving mechanism 5.

In the uniaxial drive unit 1, a screw member 6 of the motor driving mechanism 5 is fixed to the fixed table 2 via bearings 7, 7 so as to be rotatable, and a nut member, not shown, engaging with the screw member 6 is fixed to the moving table 4.

By driving a motor 8 fixed to the fixed table 2, the motor 8 being one element of the motor driving mechanism 5, the moving table 4 integral with the nut member is moved back and forth in the arrow-marked directions in FIG. 5.

As a motor used for such a uniaxial drive unit, unlike the motor shown in FIG. 5, a linear motor that is nonrotatable can also be applied. Of the linear motors, a linear motor having a fixed part, which is a rod-shaped magnet, and a moving part, which is a ring-shaped member fitted on the fixed part, having a coil member, and being capable of moving linearly along the fixed part, has features of less cogging, less unevenness of speed, and the like, and hence has been coming onto the market (for example, trade name: SHAFT MOTOR, manufactured by GMC HILLSTONE Co., Ltd.).

FIG. 6 schematically shows a cross section of such a linear motor 101. A moving part 104, which is a ring-shaped member having a coil member, is fitted on a fixed part 102, which is a rod-shaped magnet in which the N poles and the S poles are arranged alternately in a linear form. Due to the interaction between the magnetic flux of the fixed part 102 and the electric current flowing in the coil member of the moving part 104, the moving part 104 moves linearly along the fixed part 102 in accordance with Fleming's left-hand rule. The coil member of the moving part 104 is supplied with an electric current by a driving circuit, not shown.

As an improved technology for such a linear motor, a linear motor capable of operating steadily with high accuracy has been proposed (for example, see Japanese Patent Laid-Open Nos. 8-331834 and 11-150973).

The uniaxial drive unit has a joystick at an operating part, and is driven manually from low speed to high speed according to the tilt angle of the joystick.

When the moving table is driven by the above-described joystick operation, a high-speed or medium-speed operation has no problem. On the other hand, when a low-speed operation is performed, the operation must be performed by tilting the joystick through a minute angle or by switching the operation to a step feed operation. However, since the maximum tilt angle of joystick is generally small, it is difficult for the operator to carry out tiltable control of minute angle, so that it is difficult to provide fine feed to the moving table.

Also, there is known the uniaxial drive unit in which in the case of a screw feed mechanism as shown in FIG. 5, a manual knob for fine feed is connected to the screw member via a deceleration mechanism, and fine feed is provided to the moving table by manually turning the manual knob. However, the manual knob turns at the time of electrical feed, which entails a danger.

SUMMARY OF THE INVENTION

The present invention has been made in view of the above situation, and accordingly an object thereof is to provide a uniaxial drive unit using a pulse drive motor, with which the operator can perform a fine feed operation easily.

To achieve the above object, the present invention provides a uniaxial drive unit comprising a pulse drive motor having a fixed part and a moving part, which is driven by an applied pulse voltage; a fixed table; and a moving table which is supported so as to be slidable in the uniaxial direction with respect to the fixed table, wherein one of the fixed part and moving part is fixed to the fixed table, and the other of the fixed part and moving part is fixed to the moving table, a rotary pulse generating device having a knob, which is a device for generating an electric pulse for driving the pulse drive motor, is provided, the rotary pulse generating device generating a pulse of a frequency corresponding to the turning speed of the knob and generating pulses of the number corresponding to the turning angle of the knob, and fine feed is provided to the moving table by the pulse generated by the rotary pulse generating device.

According to this invention, the uniaxial drive unit is provided with the rotary pulse generating device for driving the pulse drive motor by generating a pulse of a frequency corresponding to the turning speed of the knob and generating pulses of the number corresponding to the turning angle of the knob. Therefore, merely by turning the knob manually, fine feed can be provided to the moving table safely and easily.

Also, the present invention provides the uniaxial drive unit characterized in that the pulse drive motor is a linear motor comprising a fixed part which is a rod-shaped magnet in which the N poles and the S poles are arranged alternately; and a ring-shaped moving part having a coil member, is fitted on the fixed part and can move along the fixed part.

According to this invention, since the linear motor is used as a driving motor, the moving table can be driven properly with less cogging and less unevenness of speed.

Also, the present invention provides the uniaxial drive unit characterized in that a tiltable pulse generating device having a tiltable lever, which is a device for generating an electric pulse for driving the pulse drive motor, is provided, the tiltable pulse generating device generating a continuous pulse of a frequency corresponding to the tilt angle of the tiltable lever, and the moving table is moved continuously by the continuous pulse generated by the tiltable pulse generating device.

According to this invention, high-speed and medium-speed operations can be carried out by using the tiltable pulse generating device, and low-speed fine feed can be carried out by using the rotary pulse generating device. Therefore, the operation in the range from low speed to high speed can be performed safely and easily.

Further, the present invention provides the uniaxial drive unit characterized in that a scale for detecting the position of the moving table and a servo amplifier for feedback controlling the pulse drive motor by a signal sent from the scale are provided, and when the moving table is stopped, the servo state of the servo amplifier is turned off, and when the operation of the tiltable pulse generating device or rotary pulse generating device is detected, the servo state of the servo amplifier is turned on.

According to this invention, in driving the pulse drive motor, when the moving table is stopped, the servo state is turned off, and when the operation of either of the tiltable pulse generating device and rotary pulse generating device is detected, the servo state is turned on. Therefore, the tiltable pulse generating device and rotary pulse generating device can easily be used properly.

As described above, according to the present invention, the uniaxial drive unit is provided with the rotary pulse generating device for driving the pulse drive motor by generating a pulse of a frequency corresponding to the turning speed of the knob and generating pulses of the number corresponding to the turning angle of the knob. Therefore, merely by turning the knob manually, fine feed can be provided to the moving table safely and easily.

Also, according to the present invention, since the linear motor is used as a driving motor, the moving table can be driven properly with less cogging and less unevenness of speed.

Also, the tiltable pulse generating device having the tiltable lever, which is a device for generating an electric pulse for driving the pulse drive motor, is provided, the tiltable pulse generating device generating a continuous pulse of a frequency corresponding to the tilt angle of the tiltable lever. Therefore, high-speed and medium-speed operations can be carried out by using the tiltable pulse generating device, and low-speed fine feed can be carried out by using the rotary pulse generating device, so that the operation of the moving table in the range from low speed to high speed can be performed safely and easily.

Further, in servo driving the pulse drive motor, when the moving table is stopped, the servo state is turned off, and when the operation of either of the tiltable pulse generating device and rotary pulse generating device is detected, the servo state is turned on. Therefore, two types of pulse generating devices of the tiltable pulse generating device and the rotary pulse generating device are incorporated in one control box, and thereby continuous driving and fine feed can easily be carried out properly without mutual switchover.

DETAILED DESCRIPTION OF THE PREFERRED EMBODIMENTS

Figure 1:
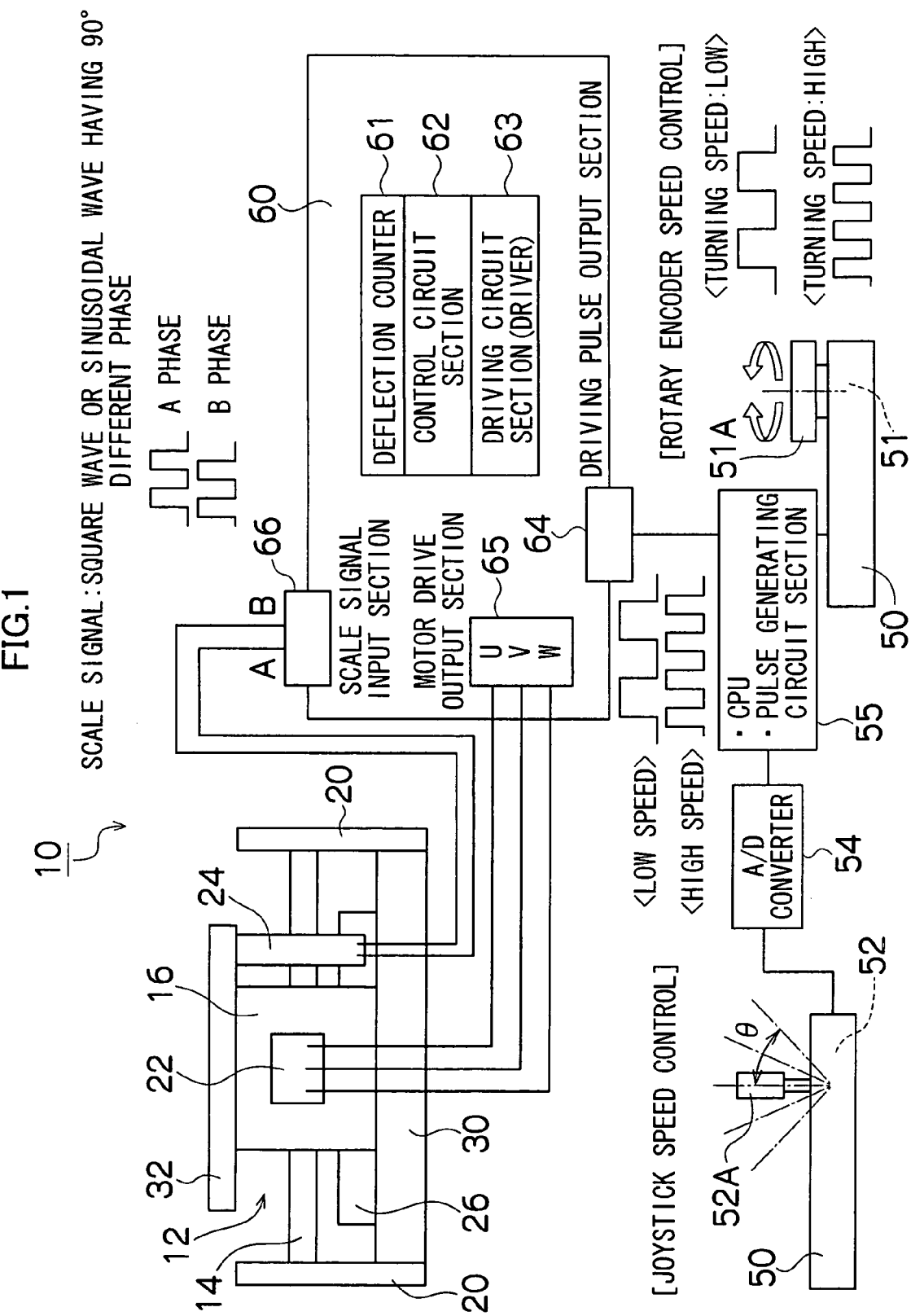
FIG. 1 is a block diagram showing a configuration of a uniaxial drive unit in accordance with an embodiment of the present invention.

A preferred embodiment of a uniaxial drive unit in accordance with the present invention will now be described in detail with reference to the accompanying drawings. In the drawings, the same reference numerals and symbols are applied to the same elements. FIG. 1 is a schematic view showing an embodiment of a uniaxial drive unit in accordance with the present invention.

A uniaxial drive unit 10 includes a fixed table 30 forming a table portion, a moving table 32, a linear motor 12, which is a pulse drive motor, a linear scale 26, which is a scale for detecting the position of the moving table 32, and a read head 24, a servo amplifier 60 for driving the linear motor 12, and a control box 50.

Figure 2:
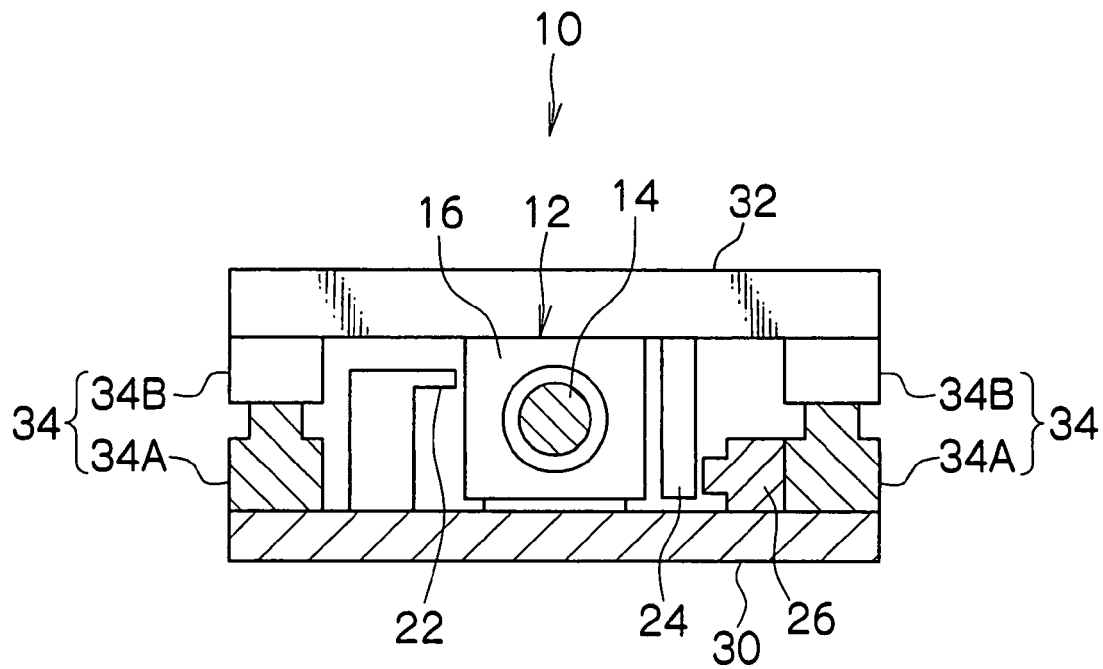
FIG. 2 is a sectional view of a table portion of the uniaxial drive unit shown in FIG. 1.
Figure 3:
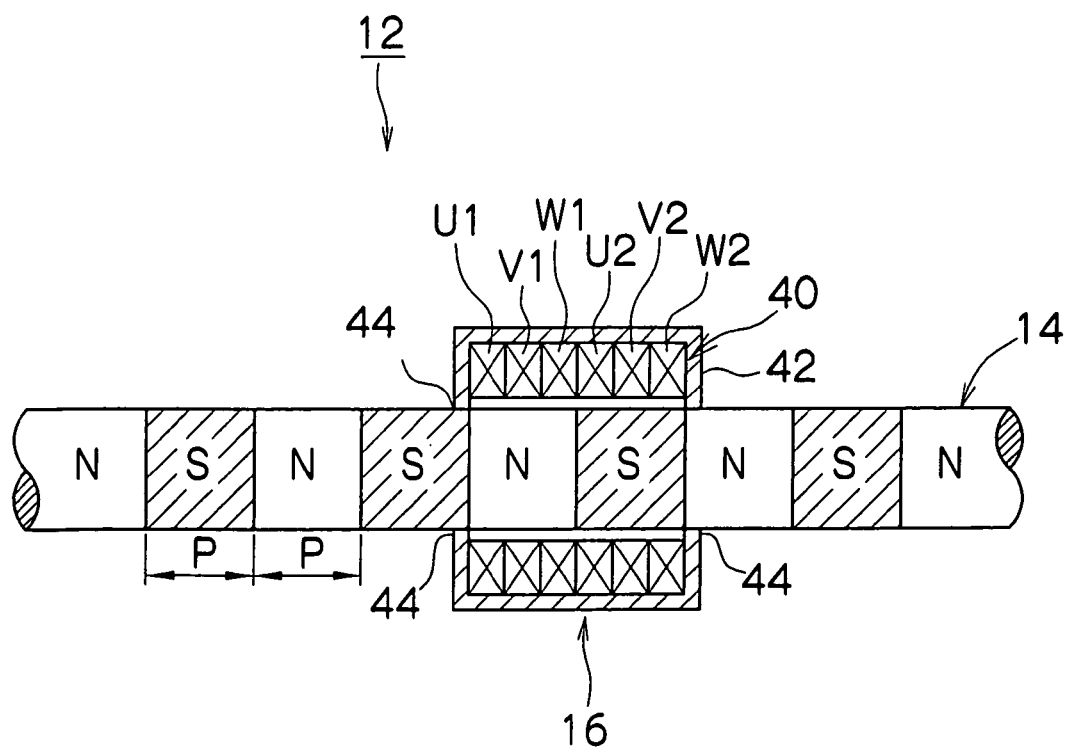
FIG. 3 is an enlarged sectional view of an essential portion of a linear motor.

FIG. 2 is a sectional view showing a construction of the table portion, and FIG. 3 is an enlarged sectional view of an essential portion of the linear motor 12.

As shown in FIGS. 1 and 2, the table portion of the uniaxial drive unit 10 includes the fixed table 30, the moving table 32, linear motion guides 34, 34 for connecting the fixed table 30 to the moving table 32 so as to be slidingly movable in the uniaxial direction (the illustration of linear motion guides 34, 34 is omitted in FIG. 1), the linear motor 12 mainly comprising a fixed part 14 and a moving part 16, fixing members 20, 20 for fixing both ends of the fixed part 14 to the fixed table 30, a cable bare 22 for supplying electric power to the moving part 16, the linear scale 26 for detecting the position in the uniaxial direction of the moving part 16 and the read head 24, and a limit sensors (not shown) which are provided near both ends of the fixed part 14 to detect an end limit of the moving part 16.

The moving part 16 of the linear motor 12 is fixed to the moving table 32, the read head 24 is fixed to the moving table 32, and the linear scale 26 is fixed to the fixed table 30.

The linear motion guide 34 has a long rail shaped fixed portion 34A and a moving portion 34B, and the moving portion 34B is supported so as to be slidable in the uniaxial direction with respect to the fixed portion 34A. As this sliding mechanism, a rolling guide (using a ball, roller, etc.), a sliding guide, and other mechanisms can be used. As the linear motion guide 34, for example, an LM guide (trade name) manufactured by THK Co., Ltd. can be used. A configuration may be used in which the moving table 32 is directly supported on the fixed table 30 so as to be slidable in the uniaxial direction without the use of the linear motion guides 34.

At least portions of the fixed table 30 and the moving table 32 which are located at the periphery of the linear motor 12 must be formed of a nonmagnetic material. In this embodiment, all portions of the fixed table 30 and the moving table 32 are formed of a nonmagnetic material. As such a nonmagnetic material, various kinds of ceramics can preferably be used. Also, various kinds of resin materials, especially engineering plastics etc., can preferably be used if their Young's modulus is higher than a predetermined value. Besides, nonmagnetic materials other than the above-described materials can be used.

Since the portions (the fixed table 30 and the moving table 32) at the periphery of the linear motor 12 are formed of a nonmagnetic material, the magnetic force of linear motor is not affected by the material at the periphery, so that the driving thrust force of the linear motor 12 is less liable to vary.

Also, the slide face between the fixed table 30 and the moving table 32 and the axis of the fixed part 14 of the linear motor 12 are arranged in substantially the same plane. Therefore, there is less influence of rolling and pitching. Also, even when there is some influence of yawing, this influence can be reduced if the length of slide face between the fixed table 30 and the moving table 32 has a predetermined value.

Next, the details of the linear motor 12 will be described with reference to FIG. 3 and other figures. The linear motor 12 is a linear motor of what is called a shaft type. As described above, the linear motor 12 is configured so that the moving part 16, which is a ring-shaped member having the coil member as a principal portion, is fitted on the fixed part 14, which is a straight rod shaped shaft member in which a magnet for producing a field is formed.

The fixed part 14 is formed of a material that is machinable and magnetizable, such as a Fe—Cr—Co based metal, and the cross section thereof is formed into a circular shape. Also, the fixed part 14 is magnetized so that there is formed magnetic flux distribution having an equal pitch along the lengthwise direction thereof, preferably of a substantially rectangular shape. Thereby, in the fixed part 14, a magnetized portion for driving, in which the N poles and the S poles are arranged alternately with the same magnetic pole width P, is formed, which forms a field magnet. The magnetic pole width P can be made, for example, 30 mm.

A coil member 40 of the moving part 16 comprises two sets of coil groups (the first set of coil group and the second set of coil group) in which three coils of U phase, V phase, and W phase forms one set. The first set of coil group comprises coils U1, V1 and W1, and these coils are arranged in the lengthwise direction of the fixed part 14 in that order. The second set of coil group comprises coils U2, V2 and W2, and these coils are arranged in the lengthwise direction of the fixed part 14 in that order. These coils each are formed so as to have a width one-third of the magnetic pole width P.

These coils constituting the coil member 40 of the moving part 16 are fixed and integrated by coating the outer peripheral surface thereof with an adhesive. The coil member 40 is incorporated in a hollow portion of a moving part frame 42 of a hollow rectangular parallelepiped shape, and is supported integrally on the inner peripheral surface of the moving part frame 42.

In both-end portions of the moving part frame 42 of the moving part 16, there are provided bearing portions 44, 44 that are fitted on the fixed part 14 and are slidable over the fixed portion 14. By the action of the bearing portions 44, 44, the moving part 16 can be moved smoothly along the fixed part 14.

Due to the interaction between the magnetic flux of the fixed part 14 and the electric current flowing in the coil member 40 of the moving part 16, the moving part 16 moves linearly along the fixed part 14 in accordance with Fleming's left-hand rule. The coil member 40 of the moving part 16 is supplied with an electric current via the cable bare 22 by the servo amplifier 60, described later.

All of other elements (the fixing member 20, the cable bare 22, the read head 24, the linear scale 26, the limit sensor 28) of the uniaxial drive unit 10 are publicly known, so that the explanation thereof is omitted.

As shown in FIG. 1, the servo amplifier 60 for driving the linear motor 12 includes a deflection counter 61, a control circuit section 62, and a driving circuit section (driver) 63, and further includes a driving pulse input section 64, a motor drive output section 65, and a scale signal input section 66.

To the scale signal input section 66, a scale signal is sent from the read head 24 of the linear scale 26. This scale signal is input as a two-phase signal of a square wave or sinusoidal wave in which A phase and B phase have a 90° different phase. Also, from the motor drive output section 65, a driving current of three phases of U phase, V phase, and W phase is supplied to the coil member 40 of the moving part 16.

When a movement target value (coordinate value) of the moving table 32 is set in the servo amplifier 60, the deflection counter 61 counts up the number of pulses corresponding to the movement target value, and always counts a deflection of the scale signal sent from the read head 24 from the counter value. The control circuit section 62 causes an electric current to flow in the driving circuit section 63 so that the deflection counter value becomes zero in real time, by which the linear motor 12 is driven via the motor drive output section 65.

When the moving table 32 is driven manually, a driving pulse current is output from the motor drive output section 65 in accordance with the number of pulses input from the control box 50 to the driving pulse input section 64, by which the linear motor 12 is driven.

As the servo amplifier 60, a commercially available servo amplifier of general specifications can be used. For example, NCR-CAB101A manufactured by Nikki Denso Co., Ltd. or SVEM2-P manufactured by Servoland Corporation may be used.

The control box 50 is provided with a tiltable pulse generating device 52 having a joystick (tilt type lever) 52A.

In the tiltable pulse generating device 52, a speed (frequency) corresponding to the tilt angle θ of the joystick 52A is assigned in advance, and when the joystick 52A is operated, a voltage corresponding to the tilt angle θ is output. The output voltage is converted into a digital signal by an A/D converter 54, and the digital signal is sent to a pulse generating circuit 55.

The pulse generating circuit 55 has a CPU. The CPU selects a setting speed from the signal input to the CPU, and outputs a pulse of a frequency corresponding to the setting speed to the driving pulse input section 64 of the servo amplifier 60. Thereby, the moving table 32 is fed continuously at a speed corresponding to the tilt angle θ of the joystick 52A during the time when the joystick 52A is tilted.

The control box 50 is also provided with a rotary encoder 51 having a knob 51A, which serves as a rotary type pulse generating device. When the knob 51A of the rotary encoder 51 is turned, a pulse signal according to the turning angle is generated at a frequency corresponding to the turning speed. The pulse signal is converted into a normal driving pulse by the pulse generating circuit section 55, and the driving pulse is sent to the servo amplifier 60. Thereby, the moving table 32 can easily be fed finely through an arbitrary distance at an arbitrary speed. As the rotary encoder 51, a rotary encoder of 50 pulses per rotation is used so that the moving table 32 can be moved with a resolution of 10 μm/pulse.

For the servo amplifier 60, the servo state is off when the moving table 32 stops. That is to say, when the positioning of the moving table 32 is finished by closed loop control, the servo control is stopped once. At this time, the joystick 52A is operated, and a voltage corresponding to the tilt angle θ is generated, by which the servo state is turned on, and thereby the joystick operation is made enable.

Also, the servo amplifier 60 is configured as described below. The knob 51A of the rotary encoder 51 is turned, the servo state is turned on by a trigger signal telling that encoder pulses are input continuously, and the moving table 32 is fed finely at a speed corresponding to the turning speed of the knob 51A by the number of pulses corresponding to the turning angle. Subsequently, the servo state is turned off and is returned to the initial state by a trigger signal telling that encoder pulses are not input for a certain period of time.

By this configuration, two types of pulse generating devices of the tiltable pulse generating device 52 and the rotary encoder 51 serving as a rotary pulse generating device are incorporated in one control box 50, and thereby continuous driving and fine feed can easily be carried out without mutual switchover.

In this embodiment, by configuring the uniaxial drive unit 10 as described above, the speed control, continuous operation, and step operation of the moving table 32 can be carried out over a wide speed range of 0.03 mm/sec to 100 mm/sec.

The following is a description of the operation of the uniaxial drive unit 10 constructed as described above. To feed the moving table 32 continuously at a high speed or a medium speed, the operator tilts the joystick 52A of the tiltable pulse generating device 52 provided on the control box 50 toward the movement direction.

At this time, a voltage corresponding to the tilt angle θ of the joystick 52A is output, and upon receipt of this voltage output, the servo state of the servo amplifier 60 is turned on. This output voltage is converted into a digital signal by the A/D converter 54, and the digital signal is sent to the pulse generating circuit section 55. In the pulse generating circuit section 55, the CPU selects a setting speed based on the input digital signal, and inputs a driving pulse of a frequency corresponding to the setting speed to the driving pulse input section 64 of the servo amplifier 60.

In the servo amplifier 60, the input driving pulse is counted up to the deflection counter 61 as needed, and the moving part 16 of the linear motor 12 is excited via the motor drive output section 65 to drive the moving part 16, by which the moving table 32 is moved. The movement distance at this time is read in real time by the read head 24 of the linear scale 26, and is input to the scale signal input section 66 of the servo amplifier 60.

The deflection counter 61 counts deflection of the number of pulses counted up in real time from the scale signal, and the control circuit section 62 controls the driving circuit section 63 so that the deflection counter value is zero. When the tilt angle θ of the joystick 52A is returned to zero, and the deflection counter value becomes zero, the moving table 32 stops, and the servo state is turned off.

Thus, merely by tilting the joystick 52A in the movement direction, the moving table 32 can be moved at a speed corresponding to the tilt angle θ during the time when the joystick 52A is tilted.

Next, to feed the moving table 32 finely, the operator turns the knob 51A for the rotary encoder (rotary pulse generating device) 51 provided on the control box 50 in accordance with the movement direction. When the knob 51A is turned, a pulse of a frequency corresponding to the turning speed is generated, and is converted into a normal driving pulse by the pulse generating circuit section 55, being input to the servo amplifier 60.

The servo state of the servo amplifier 60 is turned on by a trigger signal telling that encoder pulses are input continuously, and the servo amplifier 60 drives the linear motor 12 by the number of input pulses at the input frequency. The operation of sections in the servo amplifier 60 is the same as that in the case of the above-described joystick operation, so that the explanation thereof is omitted.

Thus, merely by turning the knob 51A for the rotary encoder (rotary pulse generating device) 51 in accordance with the movement direction by the operator, the moving table 32 can be fed finely at a speed corresponding to the turning speed by the number of pulses corresponding to the turning angle.

In the above-described operation, the servo driving in which the scale signal is fed back has been explained even in the joystick operation and manual operation of rotary knob drive, but in the case of the manual operation, the open loop control, in which driving is performed by the number of input pulses, may be carried out.

As an application of the uniaxial drive unit 10 constructed as described above, applications to driving sections of a surface roughness measuring apparatus, contour measuring apparatus, roundness measuring apparatus, three-dimensional coordinate measuring apparatus, and the like can be cited. When the uniaxial drive unit 10 is used in such applications, advantageous effects, which are characteristic of the linear motor 12, of no maintenance, no worn parts, capability of low-vibration driving, wide speed range, high rigidity, simple construction, no backlash, etc. can be achieved.

Figure 4A:
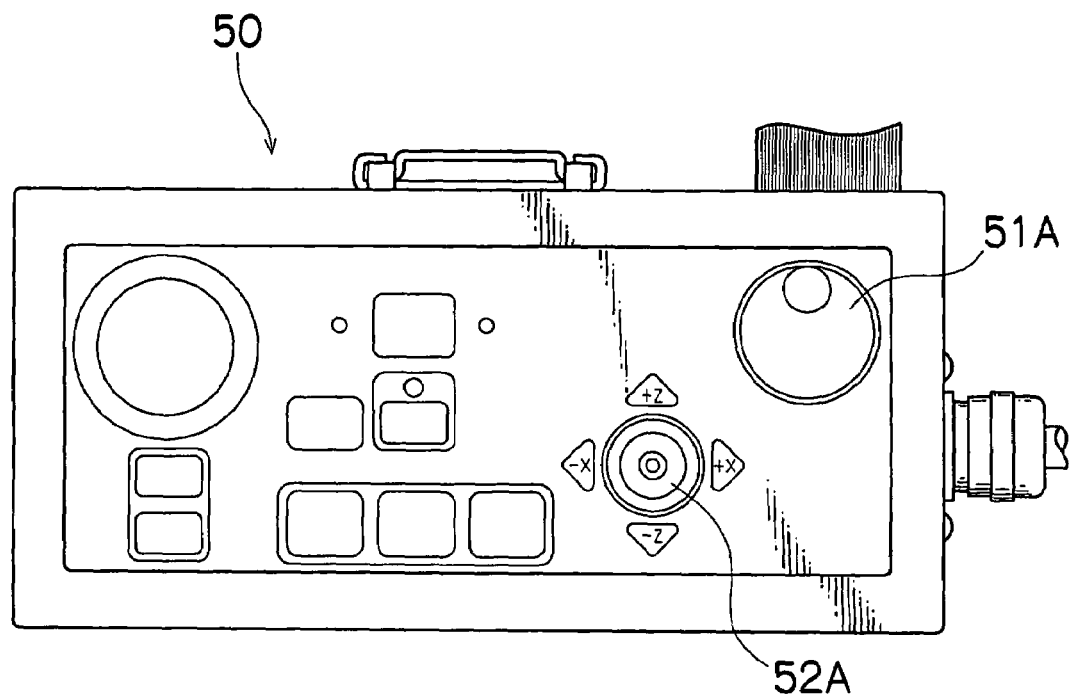
FIG. 4 is a view of a control box for a surface roughness contour measuring apparatus using the uniaxial drive unit of the present invention, FIG. 4A being a plan view and FIG. 4B being a front view.
Figure 4B:
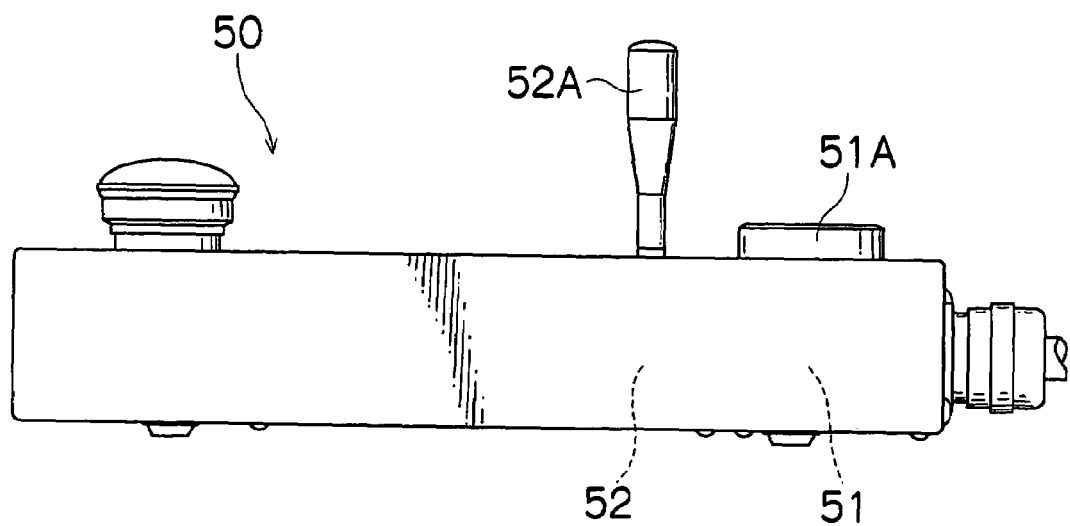
Figure 5:
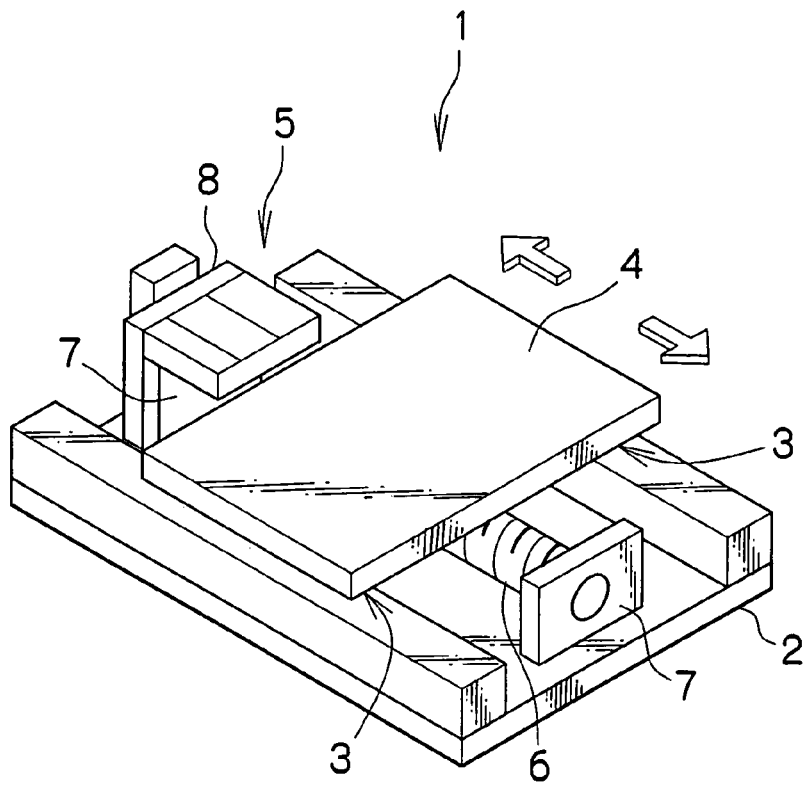
FIG. 5 is a perspective view of a table portion of a conventional uniaxial drive unit.
Figure 6:
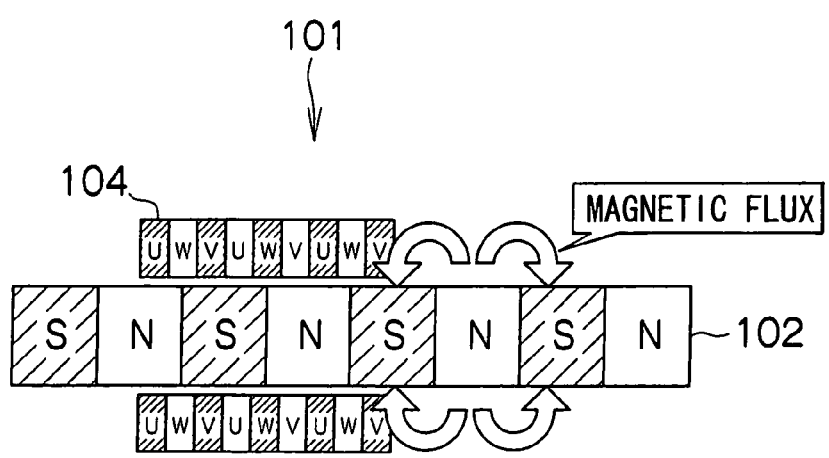
FIG. 6 is a sectional view showing the outline of a linear motor of the prior art.

FIG. 4 shows the control box 50 in the case where the uniaxial drive unit 10 constructed as described above is used for a surface roughness contour measuring apparatus, FIG. 4A being a plan view and FIG. 4B being a front view.

The surface roughness contour measuring apparatus incorporates the uniaxial drive unit 10 for driving a probe contacting on the surface of an object under test in the X—X direction in the horizontal plane, and a drive unit for driving it in the Z—Z direction perpendicular to the X—X direction.

The control box 50 for the surface roughness contour measuring apparatus is provided with the tiltable pulse generating device 52 having the joystick 52A, the rotary pulse generating device 51 having the knob 51A, and switches for performing general operations of the surface roughness contour measuring apparatus.

As shown in FIG. 4A, the tiltable pulse generating device 52 having the joystick 52A is used for joystick operation in two directions of X—X direction and Z—Z direction. When the joystick 52A is tilted in the Z—Z direction, the probe can be moved up and down continuously in the tilt direction at a speed corresponding to the tilt angle. Also, when the joystick 52A is tilted in the X—X direction, the probe can be moved continuously in the measurement direction at a speed corresponding to the tilt angle.

When a portion near a wall or in a hole of an object under test having a difference in height is measured, it is difficult to finely move the probe using the above-described joystick 52A to position the probe. However, for the uniaxial drive unit 10 in accordance with the present invention, there is provided the rotary encoder 51 serving as the rotary pulse generating device having the knob 51A as well as the tiltable pulse generating device 52 having the joystick 52A.

By turning the knob 51A of the rotary encoder 51 by the operator, the probe can be fed finely in the X—X direction through a distance corresponding to the turning angle of the knob 51A at a speed corresponding to the turning speed.

The above is a description of an example of embodiment of the uniaxial drive unit in accordance with the present invention. The present invention is not limited to the above-described embodiment, and various changes and modifications can be made. For example, although two linear motion guides 34 are provided in the embodiment, only one linear motion guide 34 may be provided.

As described above, a configuration may be used in which the moving table 32 is directly supported on the fixed table 30 so as to be slidable in the uniaxial direction without the use of the linear motion guides 34.

Also, although the rotary encoder 51 is used as the rotary pulse generating device in the embodiment, the rotary pulse generating device is not limited to the rotary encoder 51, and any other publicly known rotary pulse generating device can be used.

In the case where the linear motor 12 is applied to the uniaxial drive unit 10, and the unit 10 is used in a tilted state with respect to the horizontal plane, the driving thrust is varied by the gravity of the moving part 16. Also, when a state in which the moving part 16 is energized is kept to prevent the moving part 16 from dropping in the tilted state, heat is generated in the moving part 16, and a dimensional error of the whole of unit is likely to occur due to the heat. In order to avoid these problems, the configuration as described below can be used.

In the uniaxial drive unit which uses the linear motor 12 having a fixed part 14, which is a rod-shaped magnet in which the N poles and the S poles are arranged alternately in a linear form, and a moving part 16, which is a ring-shaped member having the coil member 40, is fitted on the fixed part 14 and can move linearly along the fixed part 14, the uniaxial drive unit is characterized in that a balance weight is arranged so as to balance with the moving part 16.

The term "balance weight" is defined as "a weight added to eliminate imbalance of a rotating body in grinding, or a weight used for balancing with the gravity of a cross rail of a gantry machine tool or a spindle head of a boring machine" (Dictionary of Cutting, Grinding, and Polishing, compiled by Society of Grinding Engineers, published by Kogyo Chyosakai Publishing Co., Ltd., 1995). In this specification, the term "balance weight" is used in the latter meaning of the above definition.

According to this configuration, balance can be attained by a balance weight having almost the same weight as the gravity of the moving part 16, or when any other element (in this example, the moving table 32) is installed to the moving part 16, balance can be attained by a balance weight having almost the same weight as the gravity of the moving part 16 and this element. Therefore, there is no influence of the gravity of the moving part 16 etc., the driving thrust is not varied, and no dimensional accuracy error occurs due to heat generation etc.

In this configuration, it is preferable that the weight of the balance weight be approximately equal to the sum of the weight of the moving part 16 and the weight of the moving table 32. Thus, balance can be attained by a balance weight having almost the same weight as the gravity of the moving part etc. Therefore, the driving thrust is not varied by the gravity of the moving part etc., and no dimensional accuracy error occurs.

Also, in this configuration, it is preferable that the weight of the balance weight be in the range of 20% up and down with respect to the sum of the weight of the moving part 16 and the weight of the moving table 32. If the weight of the balance weight is in this range, the variation in the driving thrust due to the gravity of the moving part etc. is often in an allowable range, and a dimensional accuracy error is less liable to occur.

Further, in this configuration, it is preferable that the balance weight be connected to the moving part 16 by a winding motion transmission member via a winding motion transmission support member provided near one end or both ends of the linear motor 12. If the balance weight is connected to the moving part 16 by the winding motion transmission member via the winding motion transmission support member, balance can be attained easily.

The "winding motion transmission member" is a machine element in winding transmission in mechanism study, and generally, a belt, chain, wire, etc. correspond to this member. Also, the "winding motion transmission support member" is similarly a machine element in winding transmission, and generally, a pulley, belt pulley, sprocket, etc. correspond to this member.

What is claimed is:

1. A uniaxial drive unit comprising:
   a pulse drive motor having a fixed part and a moving part, which is driven by an applied pulse voltage;
   a fixed table; and
   a moving table which is supported so as to be slidable in the uniaxial direction with respect to said fixed table, wherein
   one of said fixed part and moving part is fixed to said fixed table, and the other of said fixed part and moving part is fixed to said moving table,
   a rotary pulse generating device having a knob, which is a device for generating an electric pulse for driving said pulse drive motor, is provided, said rotary pulse generating device generating a pulse of a frequency corresponding to the turning speed of said knob and generating pulses of the number corresponding to the turning angle of said knob, and
   fine feed is provided to said moving table by the pulse generated by said rotary pulse generating device.

2. The uniaxial drive unit according to claim 1, wherein said pulse drive motor is a linear motor comprising:
   a fixed part which is a rod-shaped magnet in which the N poles and the S poles are arranged alternately; and
   a moving part having a coil member, which is fitted on said fixed part and can move along said fixed part.

3. The uniaxial drive unit according to claim 1, wherein a tiltable pulse generating device having a tiltable lever, which is a device for generating an electric pulse for driving said pulse drive motor, is provided, said tiltable pulse generating device generating a continuous pulse of a frequency corresponding to the tilt angle of said tiltable lever, and
   said moving table is moved continuously by the continuous pulse generated by said tiltable pulse generating device.

4. The uniaxial drive unit according to claim 3, wherein a scale for detecting the position of said moving table and a servo amplifier for feedback controlling said pulse drive motor by a signal sent from said scale are provided, and
   when said moving table is stopped, the servo state of said servo amplifier is turned off, and when the operation of said tiltable pulse generating device or rotary pulse generating device is detected, the servo state of said servo amplifier is turned on.

* * * * *